United States Patent

Takeuchi

[11] Patent Number: 5,875,421
[45] Date of Patent: Feb. 23, 1999

[54] TRANSLATION APPARATUS INFERRING USER'S NEEDS

[75] Inventor: Kouichi Takeuchi, Kashihara, Japan

[73] Assignee: Sharp Kabushiki Kaisha, Osaka, Japan

[21] Appl. No.: 742,477

[22] Filed: Nov. 1, 1996

[30] Foreign Application Priority Data

Nov. 6, 1995 [JP] Japan .................................. 7-287181

[51] Int. Cl.⁶ .................................................. G06F 17/28
[52] U.S. Cl. ............................................................. 704/2
[58] Field of Search ............................................ 704/1–7

[56] References Cited

U.S. PATENT DOCUMENTS

| | | | |
|---|---|---|---|
| 4,962,452 | 10/1990 | Nogami et al. | 704/4 |
| 4,977,503 | 12/1990 | Rudnick et al. | 704/7 |
| 5,523,943 | 6/1996 | Maruta et al. | 704/4 |
| 5,576,953 | 11/1996 | Hugentobler | 704/2 |
| 5,606,498 | 2/1997 | Maruta et al. | 704/2 |

FOREIGN PATENT DOCUMENTS 4-336379  11/1992  Japan .

*Primary Examiner*—David R. Hudspeth
*Assistant Examiner*—Patrick N. Edouard

[57] ABSTRACT

In a translation apparatus, a desire phrase is input via a tablet by selecting an appropriate item from a menu or inputting of a desire sentence in a first language. A desire analyzer analyzes the desire phrase and, if a conversational situation cannot be specified, presents a query for narrowing the desire content. When the conversational situation is specified, the desire analyzer presents a query for further narrowing the desire content, thereby determining the phrase to be translated. An optimum conversational sentence selector selects a conversational sentence in a second language which expresses the determined desire content from a conversational sentence storage, and a display section displays the selected conversational sentence.

6 Claims, 9 Drawing Sheets

TRANSLATION APPARATUS INFERRING USER'S NEEDS

BACKGROUND OF THE INVENTION

The present invention relates to a translation apparatus for selecting and displaying a necessary conversational sentence by inferring a user's desires and needs.

In a conventional translation-apparatus, a menu of conversational sentences in a source language which become objects of translation is searched according to a flow chart such as shown in FIG. 9. The menu searching process in this translation apparatus is explained below with reference to FIG. 9.

At step S1, a key is pressed for specifying a situation which seems to cover a conversational sentence to be spoken.

For example, there are listed situations such as "Departure", "In airplane", "Arrival at airport", "Hotels", "Restaurants", "Taxis", "Buses", "Railroad", "Rental cars", "Ships", "Sightseeing/Downtown", "Shopping", "Entertainment", "Sports", "Telephone", "Mail/money exchange", "Diseases", "Trouble", and "Basic conversation".

At step S2, a menu of detailed situations belonging to a specified situation is displayed on the display screen.

For example, the detailed situations belonging to the situation of "In airplane", include "Embarkation", "Takeoff", "In-flight services", "Trouble", "Conversation with other passengers", "Preparation for arrival", etc.

At step S3, a detailed situation which seems to have the conversational sentence to be spoken is selected on the displayed menu.

At step S4, a menu of situation examples belonging to the detailed situation selected at step S3 is displayed on the display screen.

For example, the menu of the situation examples belonging to the detailed situation of "In-flight services", includes "Meals/drinks", "Music", "Magazines/newspapers", "Movies", "Tax-free sales", "Information collection", "Borrowing of equipments", "Learning how to use/Receiving permission", "Others".

At step S5, a situation example which seems to cover the conversational sentence to be spoken is selected from the displayed menu of the situation examples.

At step S6, a first conversational sentence belonging to the situation example selected at step S5 is displayed on the display screen.

At step S7, it is decided whether or not the conversational sentence displayed on the display screen is the target conversational sentence. As a result, if it is the aimed conversational sentence, the menu searching process is ended. On the other hand, if it is not the aimed conversational sentence, the program goes to step S8.

At step S8, another conversational sentence belonging to the situation example selected at step S5 is displayed. Subsequently, the program returns to step S7, where it is decided whether or not the displayed conversational sentence is the aimed conversational sentence. Then, as described above, if it is the aimed conversational sentence, the menu searching process is ended.

In the conventional translation apparatus, however, the hierarchical level is lowered stepwise from "situations" to "detailed situations" and then to "situation examples", at the discretion of the user, whereby the scope of search is gradually narrowed so that an aimed conversational sentence is reached. Accordingly, when the aimed conversational sentence is clear as to which situation and which detailed situation it belongs to, the target conversational sentence can be searched out by a simple operation of only touching the key, without the need of turning pages as with guidebooks or conversational sentence example books. From this point of view, the conventional translation apparatus can be said to be advantageous.

Meanwhile, it is often the case for users less experienced in overseas tours to encounter trouble in manners and custom. Such users often do not know even what to say. In such a case, it would be impossible to search out a necessary conversational sentence with the conventional translation apparatus. Even if a necessary conversational sentence has been found out, it is possible that the user cannot decide whether or not the found conversational sentence is a proper one.

Due to the arrangement that an target conversational sentence is reached by narrowing the scope of search with the hierarchical level gradually lowered, the conventional translation apparatus has a further problem that the number of conversational sentences that can be registered is limited naturally to maintain a certain degree of searching ability.

Furthermore, when there is something more to say after a selected conversational sentence has been spoken, the same searching process as with the preceding conversational sentence must be repeated once again to search out a next conversational sentence even if the next conversational sentence has a relation to the preceding conversational sentence. This is laborious.

SUMMARY OF THE INVENTION

The object of the present invention is therefore to provide a translation apparatus which is capable of displaying a necessary conversational sentence by inferring user's needs only with an input of a desire that gives an initial clue.

In order to accomplish the above object, the present invention provides a translation apparatus which comprises (a) an input section through which a desire sentence using a phrase meaning "want to" or any equivalent phrase is input in a first language to the translation apparatus by a user, (b) a conversational sentence storage for storing conversational sentences in a second language associated with desires, (c) a desire analyzer for analyzing the desire sentence input through the input section to clarify a content of a desire that the user potentially has with respect to the desire sentence, (d) a conversational sentence selector for, upon receiving an analysis result from the desire analyzer, selecting a conversational sentence which expresses the clarified content of the desire, from the conversational sentences in the second language stored in the conversational sentence storage, and (e) a display section for displaying the conversational sentence selected by the conversational sentence selector.

With this arrangement, when an initial-clue desire is entered by inputting a desire sentence using a phrase meaning "want to" or any equivalent phrase via the input section, the input desire sentence is analyzed by the desire analyzer so that the content of a desire that the user potentially has with respect to the desire sentence is clarified. As a result, a conversational sentence or sentences that express the clarified content of the potential desire are selected by the conversation selector as optimum conversational sentences corresponding to the desire sentence, and the selected conversational sentence or sentences are displayed on the display section. That is, only by entering a first-clue desire in the form of "want to" or any equivalent form in the first language via the input section, an optimum conversational sentence or sentences in the second language are automatically displayed.

Therefore, according to the invention, it is not necessary for the user himself or herself to narrow the scope by lowering the hierarchical level, for example, from "situation" to "detailed situation", then to "specific situation example" based on the user's own judgements. Therefore, the user does not need to know which detailed situation of which situation the aimed conversational sentence belongs to. This means that even those users less experienced in overseas tours can freely make use of the translation apparatus of the invention.

Further, as described above, the desire sentence input using the phrase "want to" or any equivalent phrase is analyzed by the desire analyzer, and an aimed conversational sentence is obtained based on the result of this analysis, and without relying on the user's judgement. Thus, the translation apparatus is superior in searching ability, and the number of conversational sentences that can be registered is not limited.

In one embodiment, the desire analyzer included a situation deciding means for deciding whether or not a conversational situation can be specifically determined with respect to the input desire sentence, and for, when the situation is specifically determined, deciding whether or not the specifically determined situation is a previously registered situation, a desire content deciding means for deciding whether or not a desire content in the desire sentence can be specifically determined within the specifically determined situation, and outputting the desire content, when specifically determined, as the analysis result, and a querying means for querying the user about conditions necessary for specifically determining the situation and/or the desire content with respect to a desire sentence for which the situation deciding means has decided that the situation cannot be specifically determined and/or the desire content deciding means has decided that the desire content cannot be specifically determined. The situation deciding means and the desire content deciding means respectively decide whether or not the situation and the desire content can be specifically determined by making reference to a content of a response of the user to a query of the querying means.

With this arrangement, with respect to a desire sentence for which the situation deciding means has decided that the situation cannot be specifically determined and/or the desire content deciding means has decided that the desire content cannot be specifically determined, a condition needed for specifically determining the situation or the desire content is queried by the querying means. Therefore, by making reference to a user's response to the query, the situation and the desire content can be made more specific.

In this way, the situation and the desire content are made more and more specific automatically. In other words, the desire that the user potentially has can be clarified without burdening the user.

In an embodiment, the desire analyzer further comprises condition extraction means for extracting a condition for specifically determining the situation or the desire content, from the content of the user's response to the query. And, the translation apparatus further comprises a condition storage for storing the conditions extracted by the condition extraction means. The situation deciding means and the desire content deciding means respectively decide whether or not the situation and the desire content can be specifically determined by making reference to the conditions stored in the condition-storage.

In the above translation apparatus, the conditions for specifically determining the situation and/or the desire content once designated by the user are registered in the condition storage. Therefore, when a desire sentence related to the conversational sentence displayed on the display section is entered, the situation and/or the desire content is automatically specified to some degree by making reference to the conditions stored in the condition storage.

Thus, with respect to the desire sentence input by the user, the situation and/or the desire content is specifically determined promptly with a reduced number of queries made by the querying means. Thus, the present invention provides an intelligent translation apparatus.

DETAILED DESCRIPTION OF THE PREFERRED EMBODIMENTS

Hereinbelow, the present invention is described in more detail based on an embodiment thereof as illustrated in the accompanying drawings.

Figure 1:
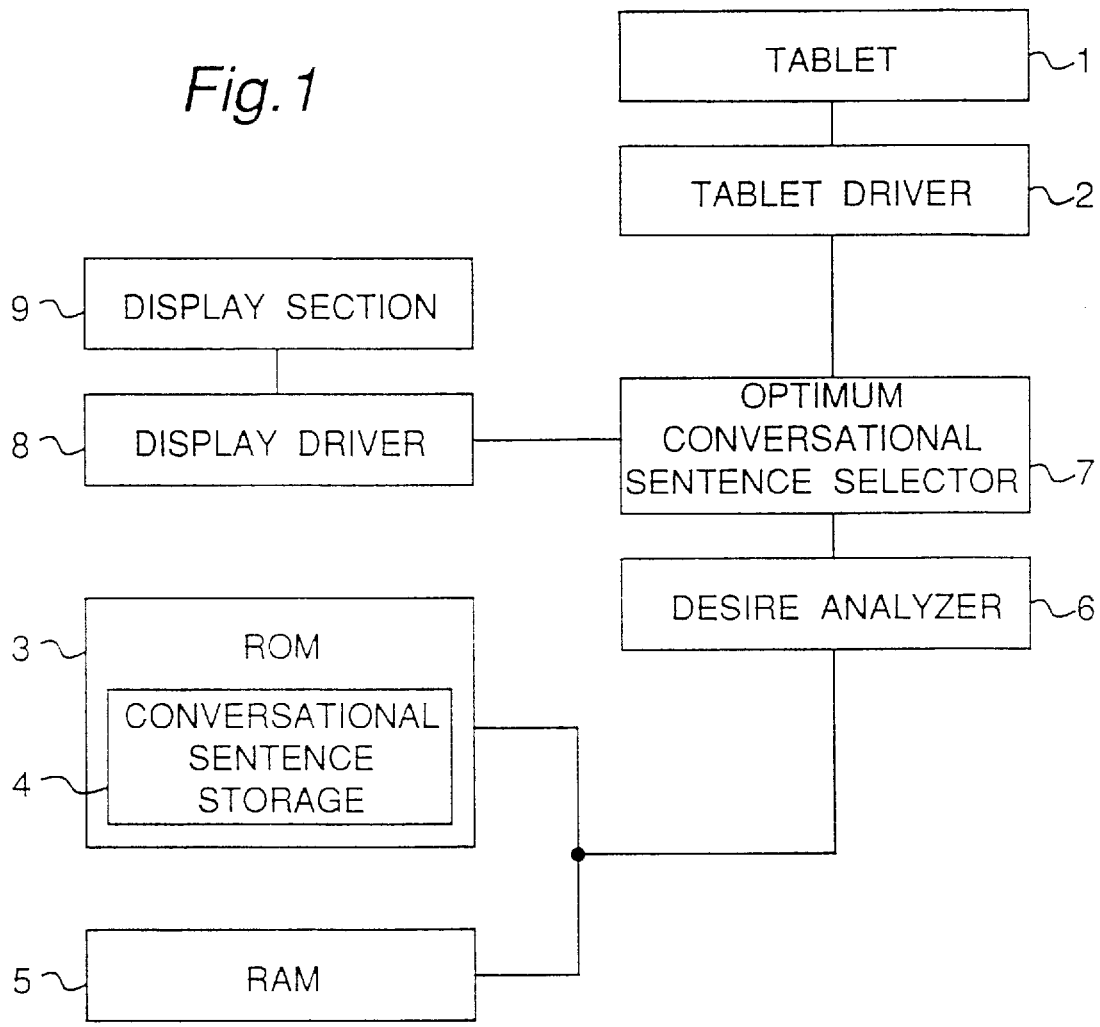
FIG. 1 is a block diagram of a translation apparatus of the present invention.

FIG. 1 is a block diagram of the translation apparatus of this embodiment. In order to respond to user's needs with a large number of conversational sentences registered, the translation apparatus of this embodiment specifically determines a proper situation matching a desire automatically by analyzing a desire sentence entered by the user. The translation apparatus further specifically determines the content of the user's desire by acquiring a condition concerning the desire through an interaction with the user, and thus selects and displays an optimum conversational sentence.

The acquired condition concerning the desire is stored in a RAM (Random Access Memory). This makes it possible to avoid iterations of the same queries over and over again in searching out conversational sentences related to the preceding conversational sentence. Thus, the user will receive an impression of an intelligent system.

A tablet 1, which is driven by a tablet driver 2, is used for character input of a desire sentence or the like in a first (source) language.

A ROM (Read Only Memory) 3, stores programs for executing the translation process, which will be detailed later. The apparatus further has a conversational-sentence storage 4, in which conversational sentences in a second language are stored.

In a RAM 5, translation-related information including conditions concerning a user's desire obtained through an interaction with the user in the translation process is stored.

A desire analyzer 6 analyzes the desire sentence in the first language entered via the tablet 1 or the user's desire designated by the tablet 1, by referring to the desire-related conditions stored in the RAM 5, to grasp the content of the desire that the user potentially has.

Upon receiving an analysis result from the desire analyzer 6, an optimum conversational sentence selector 7 selects a conversational sentence in a second (target) language matching the user's desire from the conversational sentences stored in the conversational sentence storage 4.

A display driver 8, under the control of the optimum conversational sentence selector 7, drives a display section 9 comprising a liquid crystal display device or the like, to display thereon a conversational sentence in the second language having the same content as that of the desire sentence in the first language entered from the tablet 1.

It is noted that the tablet 1 and the display section 9 may be formed integrally, and that the RAM 5 may be another storage medium.

The translation apparatus with the above arrangement carries out a translation process by the desire analyzer 6 and the optimum conversational sentence selector 7 as follows.

Figure 2:
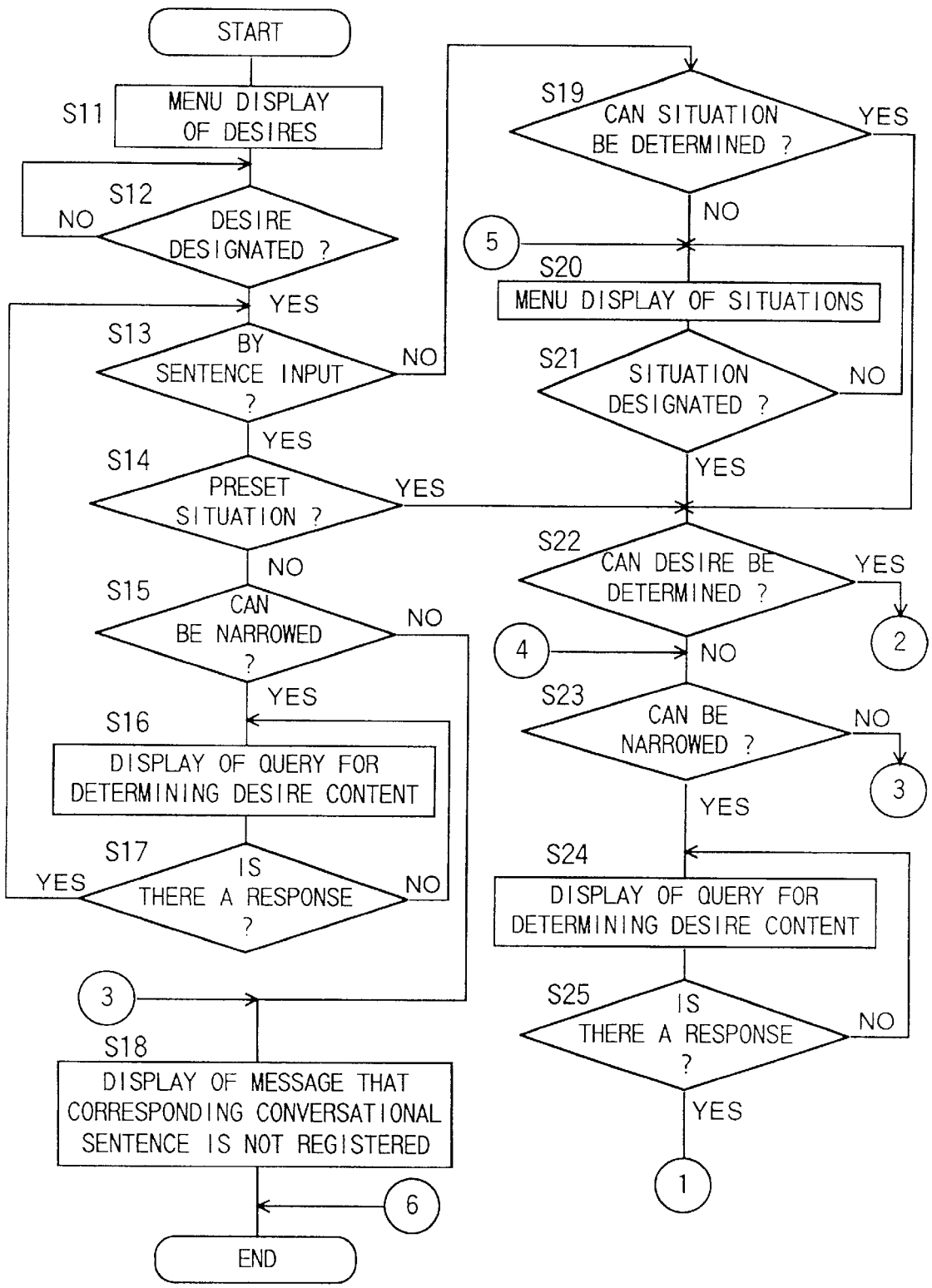
FIGS. 2 and 3 are flow charts of a translation operation executed by a desire analyzer and an optimum conversational sentence selector in FIG. 1.
Figure 3:
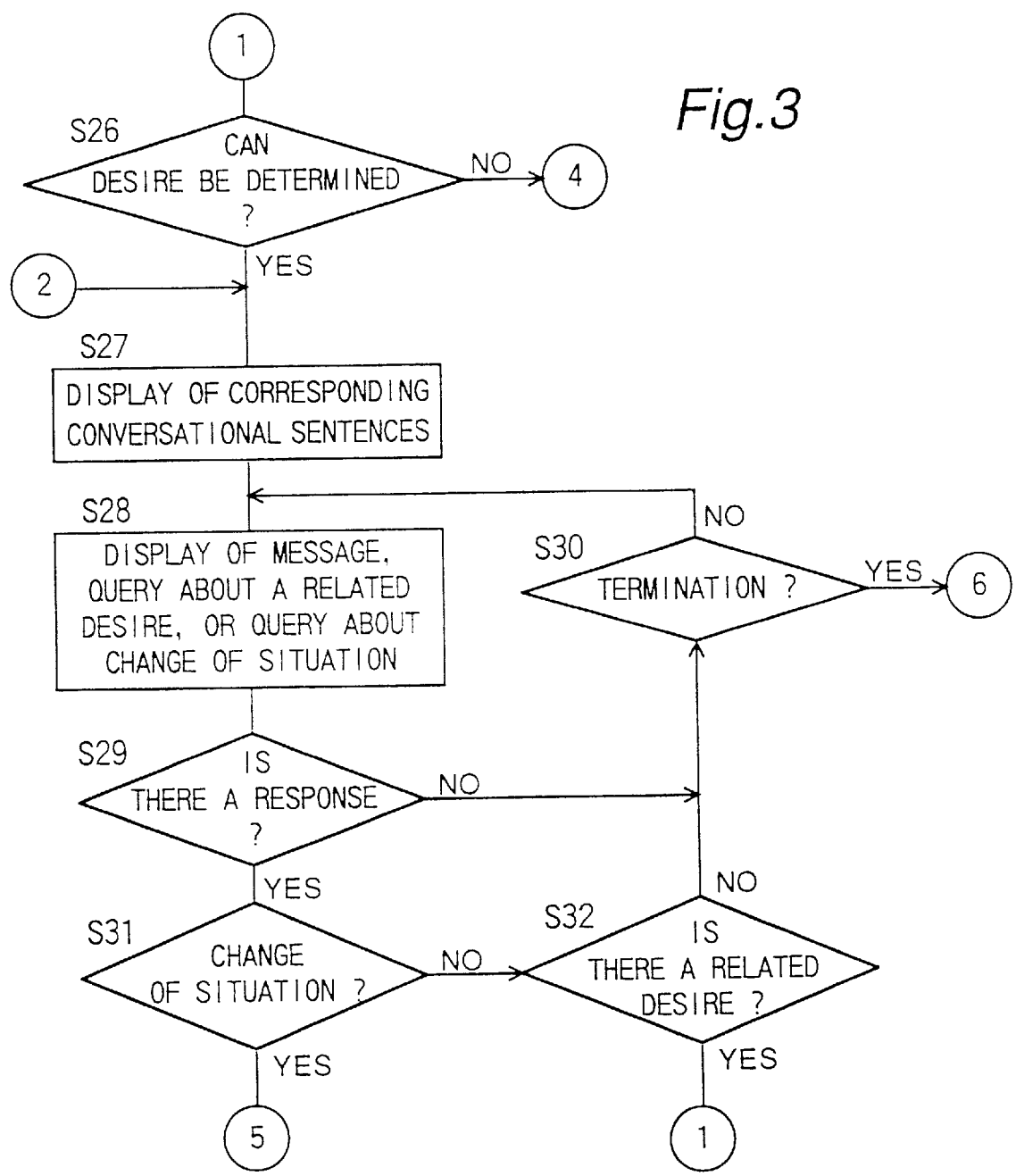

FIGS. 2 and 3 are flow charts of a translation operation to be executed by the desire analyzer 6 and the optimum conversational sentence selector 7. The translation operation is explained in detail below according to FIGS. 2 and 3. It is noted that, out of the steps in the flow charts, step S27 is processed by the optimum conversational sentence selector 7, and the other steps are processed by the desire analyzer 6.

At step S11, a menu of desire sentences is displayed on the display section 9.

At step S12, it is decided whether or not a desire sentence has been designated by the user according to the menu. As a result, if it has been designated, the program goes to step S13; if not, it awaits a designation.

At step S13, it is decided whether the designation has been given by a menu selection or by a desire sentence described directly in the form of "want to do". As a result, if it is by a sentence input, the program goes to step S14; if it is by a menu selection, the program goes to step S19.

At step S14, by referring to the conditions concerning desires acquired in previous translation processes, if stored in the RAM 5, it is decided whether or not the desire designated by the desire sentence at step S12 is a desire relating to a preset situation. As a result, if it is a desire relating to a preset situation, the program goes to step S22; if not, it goes to step S15.

At step S15, it is decided whether or not the desire content of the designated desire sentence can be narrowed, or more specific. As a result, if it can, the program goes to step S16; if it cannot be narrowed any more, the program goes to step S18.

At step S16, a menu of queries for specifically determining the desire content of the designated desire sentence is displayed.

At step S17, it is decided whether or not a response by the user to the menu displayed at step S16 is present. As a result, if a response is present, the program returns to step S14 to proceed to the analysis of the content of the response; if not, the program returns to step S16 to await a response.

Then, at step S14, with the content of the response taken into account, if the desire content of the desire sentence designated at step S12 is decided to be a desire relating to a preset situation, the program moves to step S22.

On the other hand, at step S18, the display section 9 displays a message that no conversational sentences in the second language corresponding to the desire sentence in the first language designated at step S12 have been registered. After that, the translation operation ends.

At step S19, conditions concerning the desire are extracted from the desire (sentence) designated at step S12 and stored in the RAM 5. Then, by referring to all the conditions concerning the desires stored in the RAM 5, it is decided whether or not the conversational situation can be specifically determined from the desire (sentence). As a result, if it can be specifically determined, the program goes to step S22; if not, it goes to step S20.

At step S20, a menu for specifying the situation is displayed.

At step S21, it is decided whether or not a situation has been specified according to the menu. As a result, if it has been specified, the program goes to step S22; if not, the program returns to step S20, awaiting a designation.

At step S22, conditions concerning the desire are extracted from the situation designated at step S21 and stored in the RAM 5. Then, by referring to all the conditions concerning the desires stored in the RAM 5, it is decided whether or not the desire content of the desire sentence can be specifically determined. As a result, if it can be specifically determined, the program goes to step S27; if not, the program goes to step S23.

At step S23, it is decided whether or not the desire content of the desire sentence can be made more specific. As a result, if it can be made more specific, the program goes to step S24; if it cannot be made any more specific, the program goes to step S18.

At step S24, a selection menu starting with a query for specifically determining the desire content of the desire sentence is displayed.

At step S25, it is decided whether or not a response by the user to the menu displayed at step S24 is present. As a result, if a response is present, the program goes to step S26; if not, the program returns to step S24 to await a response.

At step S26, a condition concerning the desire is extracted from the content of the response and stored in the RAM 5. Then, by referring to all the conditions concerning the desires i.e. desire-related conditions stored in the RAM 5, it is decided whether or not the desire content of the user can be specifically determined. As a result, if it can be specifically determined, the program goes to step S27; if not, the program returns to step S23 to proceed to a further narrowing of the desire content.

At step S27, since the desire content of the entered desire sentence has been specifically determined, a conversational sentence in the second language matching the specified desire content is read out from the conversational sentence storage 4 of the ROM 3, and displayed on the display section 9.

At step S28, a message concerning the conversational sentence displayed at step S27, or a query as to the presence or absence of a relevant desire relating to the desire content of the conversational sentence displayed at step S27, or a query as to a change to another situation is displayed in accordance with the content of the conversational sentence displayed on the display section 9 at step S27.

At step S29, it is decided whether or not a response by the user to the query displayed at step S28 is present. As a result, if a response is present, the program goes to step S31. On the other hand, if no response is present for a specified time duration, the program goes to step S30.

At step S30, it is decided whether or not termination of the translation operation has been designated from, for example, the tablet 1. As a result, if the termination has not been designated, the program returns to step S28, awaiting a response from the user. On the other hand, if the termination has been designated, the program ends the translation operation.

At step S31, it is decided whether or not the response made at step S29 designates a change to another situation. As a result, if the response designates a change to the next situation, the program returns to step S20 to proceed to a process for the next situation. On the other hand, if the response does not designate a change to the next situation, the program goes to step S32.

At step S32, it is decided whether or not the response made at step S29 indicates that there is a relevant desire. As a result, if there is a relevant desire, the program returns to step S30, proceeding to a decision as to whether or not the translation operation should be ended. On the other hand, if there is a relevant desire, the program returns to step S26 to start an analysis of the relevant desire.

Then, if the operation termination is designated at step S30, the translation operation is ended.

Steps S14 and S19 constitute the situation deciding means, steps S22 and S26 constitute the desire content deciding means, steps S16, S20 and S24 constitute the querying means, and steps S19, S22 and S26 constitute the condition extracting means.

Next, the translation operation is explained more specifically by way of examples with reference to FIGS. 4 to 8. In connection with "desires when going on board the plane", FIGS. 4 to 8 show display contents of the display section 9, input contents from the tablet 1, and discrimination contents by the desire analyzer 6. In the figures, a rectangular block in solid line shows display contents of the display section 9, a rectangular block in broken line shows contents of a desire sentence entered from the tablet 1, a rectangular block in double line shows contents of a discrimination made by the desire analyzer 6 based on the conditions concerning the desire stored in the RAM 5, and a rectangular block in dot-and-dash line shows contents of the displayed conversational sentence.

It is noted that in FIGS. 4–8 the wording enclosed by double quotation marks "" shows the contents of an item selected from the menu display screen. Also note that in the following description and FIGS. 4–8, the English language is used as a first (source) language, but that any other language can be used as the first language.

First, with the power turned on, the translation operation starts. Then, as shown by a display example D1, a selection menu with a query "What assistance do you want?" is displayed. When an item of "on board airplane" is selected from the menu, another menu of "assistance available on board airplane" is displayed. Then, when an item of "desires about seat" is selected from the menu, the processing for a preset situation of "seating" is started.

Now that the desire entered by the user has been determined to be "inquiry about seat on board airplane", conversational sentences in the second language for "inquiry about seat on board airplane" are selected from the conversational sentence storage 4 and displayed.

. . . steps S11 to S13, steps S19 to S22, and S27

Meanwhile, when an item of "designate by input" is selected from the menu of "What assistance do you want?" displayed as shown in the display example D1, a desire sentence, such as "want to find a seat", "want to take a seat", or "want to sit on a seat", as shown in a desire sentence example B1, is entered directly. Then the processing for the preset situation of "seating" is started.

However, only with a desire sentence, "want to find a seat", "want to take a seat", or "want to sit on a seat", the desire cannot be specifically determined because the kind of seat is unclear. Therefore, in order to narrow the scope of the desire, or make the desire more specific, a selection menu with a query "What kind of seat?" is displayed, as shown in a display example D3. When an item of "airplane" is selected from the menu, the user's desire is determined to be "inquiry about seat in airplane", so that conversational sentences in the second language corresponding to the desire of "inquiry about seat in airplane" are selected from the conversational-sentence storage 4, and displayed.

. . . steps S11 to S14, and steps S22 to S27

In this way, conversational sentences in the second language usable when making "inquiry about seat in airplane" are displayed. Thereafter, a menu of "other desires about seat" is displayed as shown by a display example D4. Then, with an item of "move/change a seat" selected from the menu, the user's desire is specifically determined to be to "move/change a seat in airplane", so that conversational sentences usable when one wants to "move/change a seat in airplane" are selected and displayed. Meanwhile, when an item of "Tilt/erect a seat" is selected from the menu, the user's desire is specifically determined to be to "tilt/erect a seat in airplane", so that conversational sentences usable when one wants to "tilt/erect a seat in airplane" are displayed. Also, when an item of "complain" is selected, the user's desire is specifically determined to be to "complain about seat in airplane", so that conversational sentences for "complaints about seat in airplane" are displayed.

. . . steps S28, S29, S31, S32, S26, and S27

At the time when the selection menu with the query "What assistance do you want?" is displayed as shown in display example D1, directly entering a desire sentence, such as "want to tilt a seat", "want to change a seat", "want to erect a seat", or "want to move a seat", as shown in a desire sentence example B2 after the selection of the item of "specify by input" makes the program start the processing for a preset situation of "taking a seat". Then, in order to further narrow the desire, such as "want to tilt a seat", "want to change a seat", "want to erect a seat", or "want to move a seat", a selection menu with the query "What kind of seat?" is displayed as shown in display example D3. Then, in the case of selection of the item "Airplane", if the desire directly entered through input of the desire sentence is to "move a seat" or to "change a seat", then the user's desire is specifically determined to be to "move/change a seat in airplane". Accordingly, conversational sentences usable when one wants to "move/change a seat in airplane" are displayed. Meanwhile, if the desire directly entered by way of the desire sentence is to "tilt a seat" or "erect a seat", then the user's desire is specifically determined to be to "tilt/erect a seat in airplane". Therefore, conversational sentences usable when one wants to "tilt/erect a seat in airplane" are displayed.

. . . steps S11 to S14, and steps S22 to S27

After conversational sentences in the second language for another "desire about seat in airplane" are displayed in the above manner, a query "Is that all of desires about seat?" then appears, succeedingly, as shown in a display example D5. Then, if the user's response is "No" meaning that the user has another desire about seat, then the display example D4 is displayed once again, and the processing for another desire about seat is started.

. . . steps S28, S29, S31, S32, S26, S23, and S24

On the other hand, if the user's response is "Yes" meaning that the user has no more desires about seating, then the processing for the preset situation of "taking a seat" is ended, and a message that "Make yourself at home until takeoff" is displayed as shown by a display example D6. Then, in a specified time, the display message is changed to "Has the airplane taken off?", as shown by a display example D7.

At this point, if the user's response is "No." meaning that the airplane has not taken off yet", the display example D6 is displayed once again, and in another specified time it is changed to the display example D7. In this way, the display examples D6 and D7 are alternately displayed until a response indicating that the airplane has taken off is given by the user in the display example D7.

. . . steps S28, S29, S31, S32, S30, S28, S29, S30, and S28

To the query "Has the airplane taken off?" of the display example D7, if a response indicating that "The airplane has taken off." is given by the user, then the "Assistance available in airplane" menu of the display example D2 is displayed once again. Then, if an item "Order for food/drinks" is selected, the program enters the processing for a preset situation of "Order for food/drinks".

. . . steps S28, S29, S31, S20 and S21

On the display section 9, a query "Do you order drinks (only) (as well)?" with answer options is menu-displayed as shown by a display example D8.

Then, if an item "Both" is selected, the desire entered by the user is specifically determined to be to "order both food and drink", and conversational sentences for ordering drinks are first displayed. Thereafter, in a specified time, conversational sentences for ordering food are displayed. Meanwhile, if an item "Only food" is selected, the desire entered by the user is specifically determined to be to "order food", and only conversational sentences for ordering food are displayed. Further, if an item "Only drinks" is selected, the desire entered by the user is specifically determined to be to "order drinks", and only conversational sentences for ordering drinks are displayed.

After these steps, a selection menu with a query "What do you do next?" is displayed in connection with the situation of "Order for food/drinks/", as shown by a display example D9.

. . . steps S22 to S27

After this, likewise, with the-query "What do you do next?" of the display example D9 displayed, if the use's response is "Urging of order", then conversational sentences for urging the order are displayed. Meanwhile, if the response is "Confirmation of order", conversational sentences for confirming the order are displayed. If the response is "Change of order", conversational sentences for changing the order are displayed. If the response is "Complaint about dishes", conversational sentences of complaints on dishes are displayed.

. . . steps S29, S31, S32, S26 and S27

If the response is "Another situation", the program terminates the processing for "Order for food/drinks", and the menu of "Assistance available in airplane" of the display example D2 is displayed. Then, when another situation is designated, the program proceeds to the processing for the next designated situation, such as "Inquiring" or "Asking for other services".

. . . steps S29, S31, S20, S21

Figure 4:
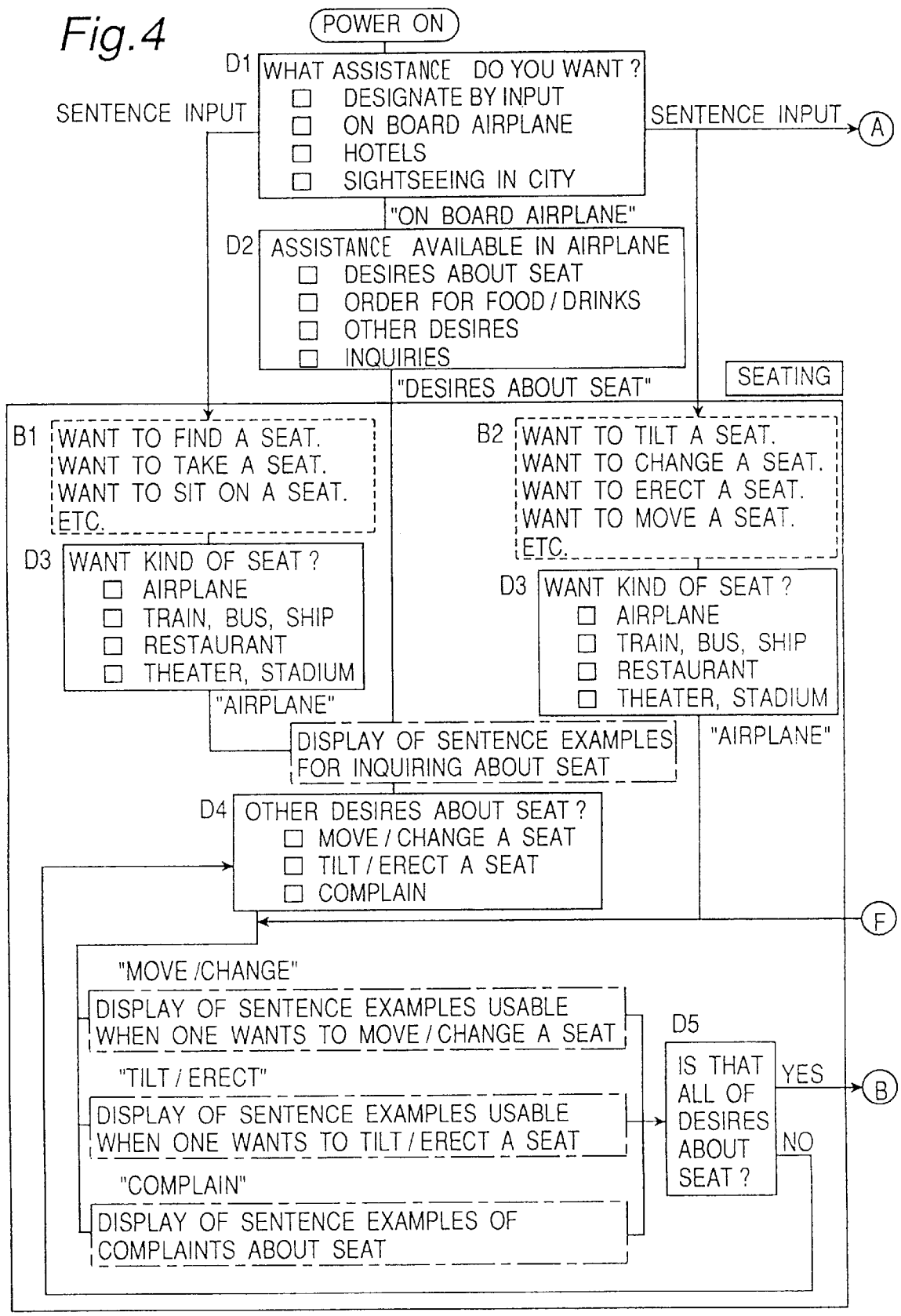
FIGS. 4, 5, 6, 7 and 8 illustrate a specific example of the transition of display contents on the display section, contents of desire sentences input via the tablet, discrimination contents by the desire analyzer, and resulting conversational sentences, in the translation operation in FIGS. 2 and 3.
Figure 5:
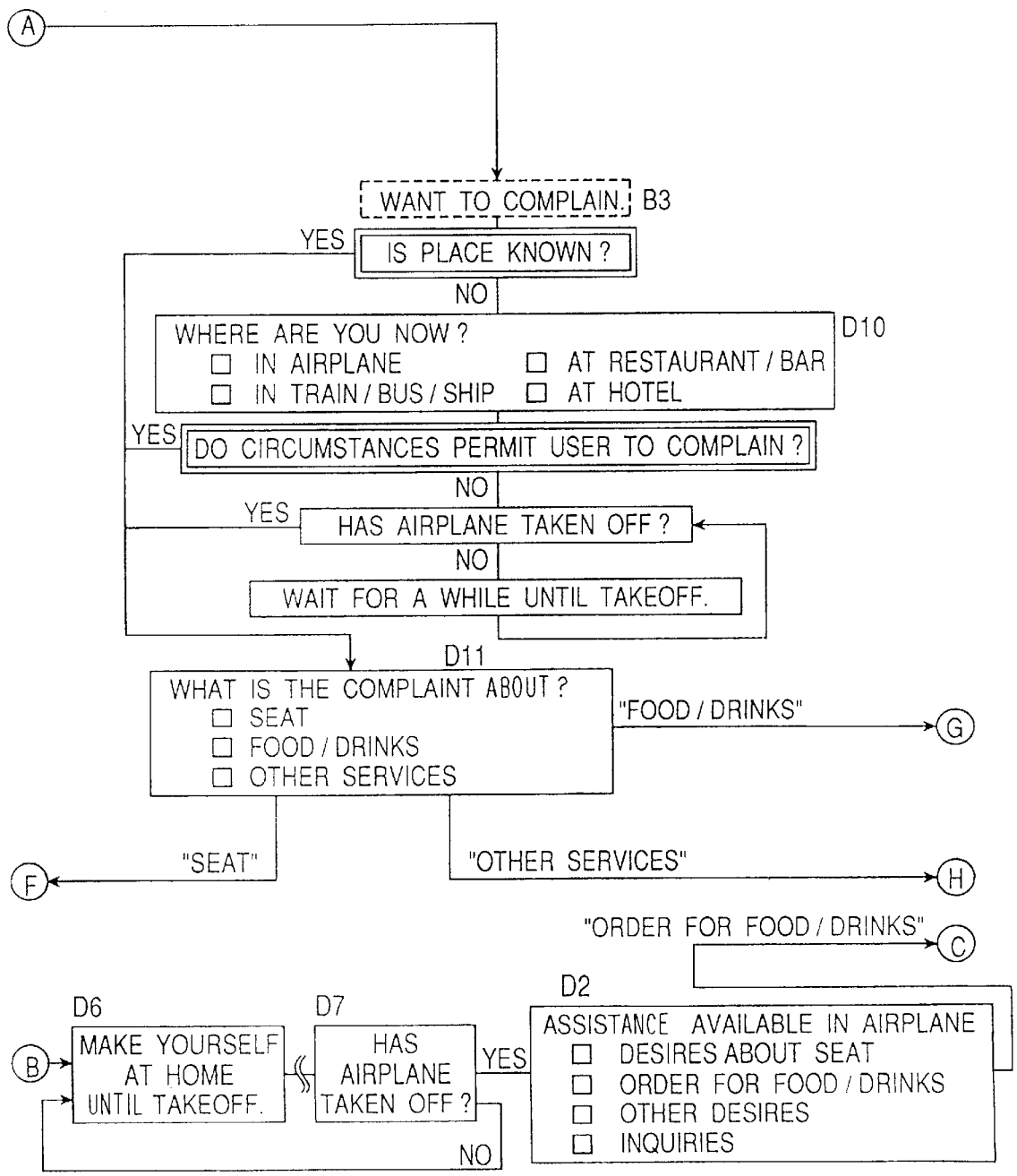
Figure 6:
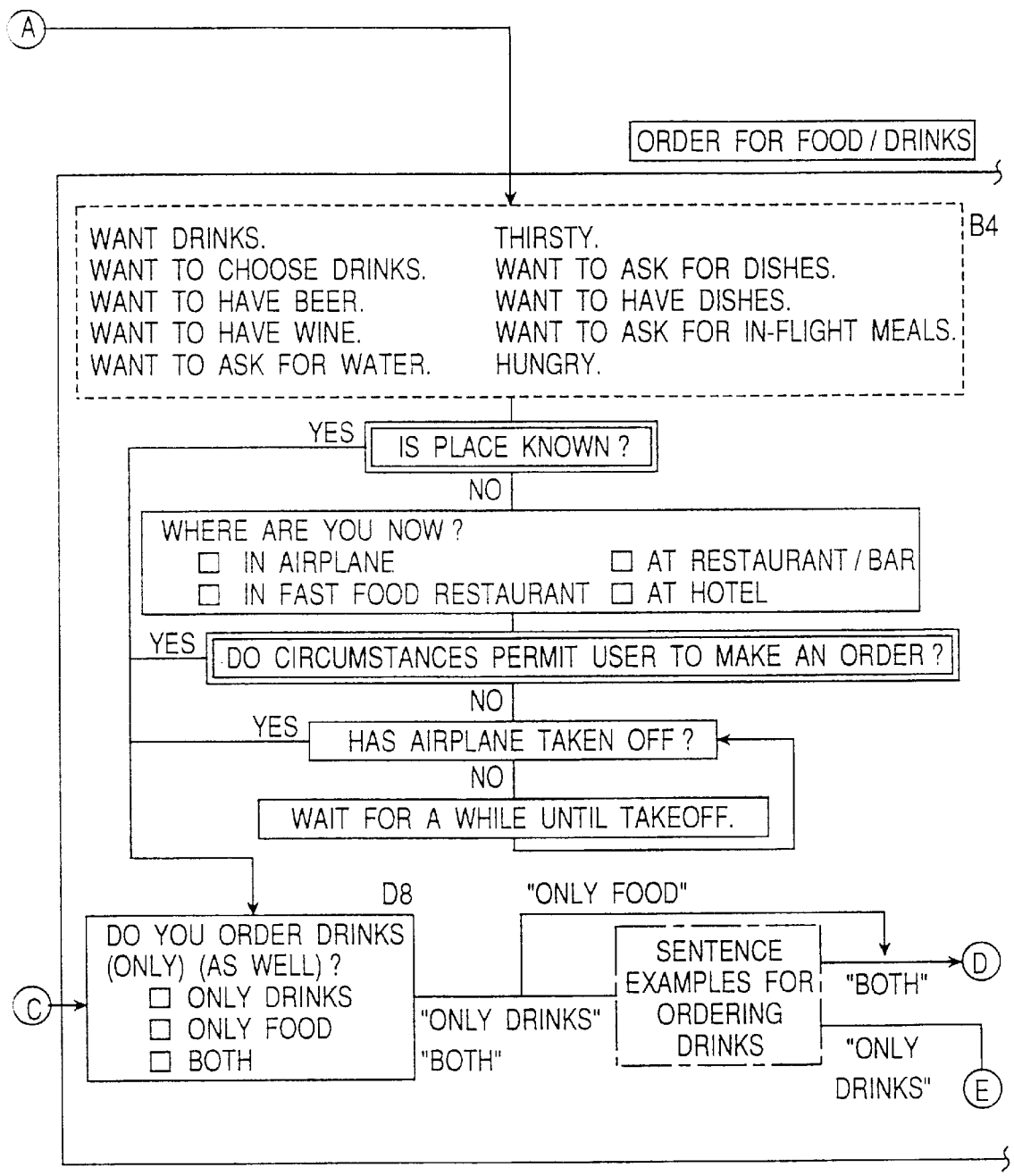
Figure 7:
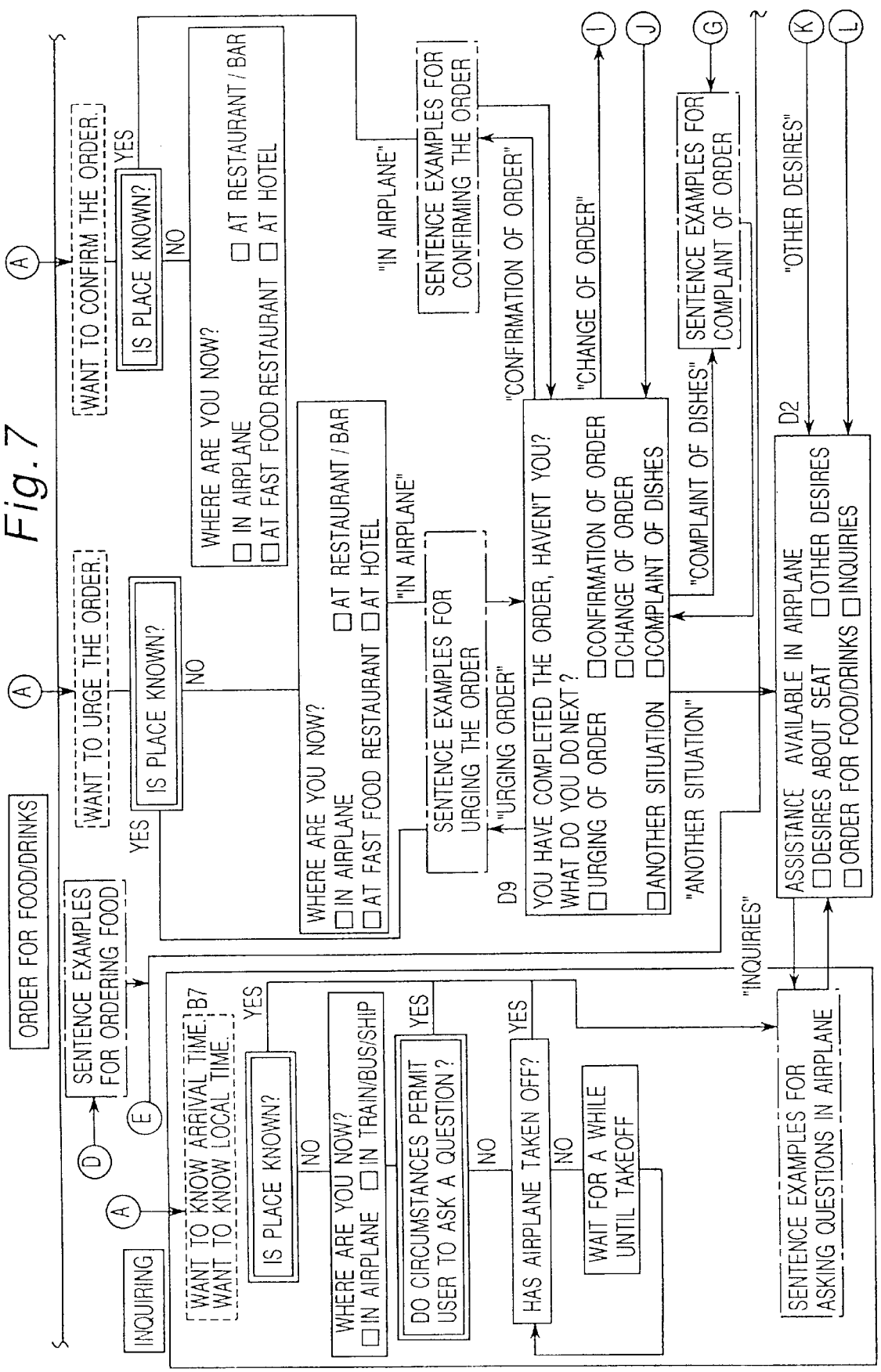
Figure 8:
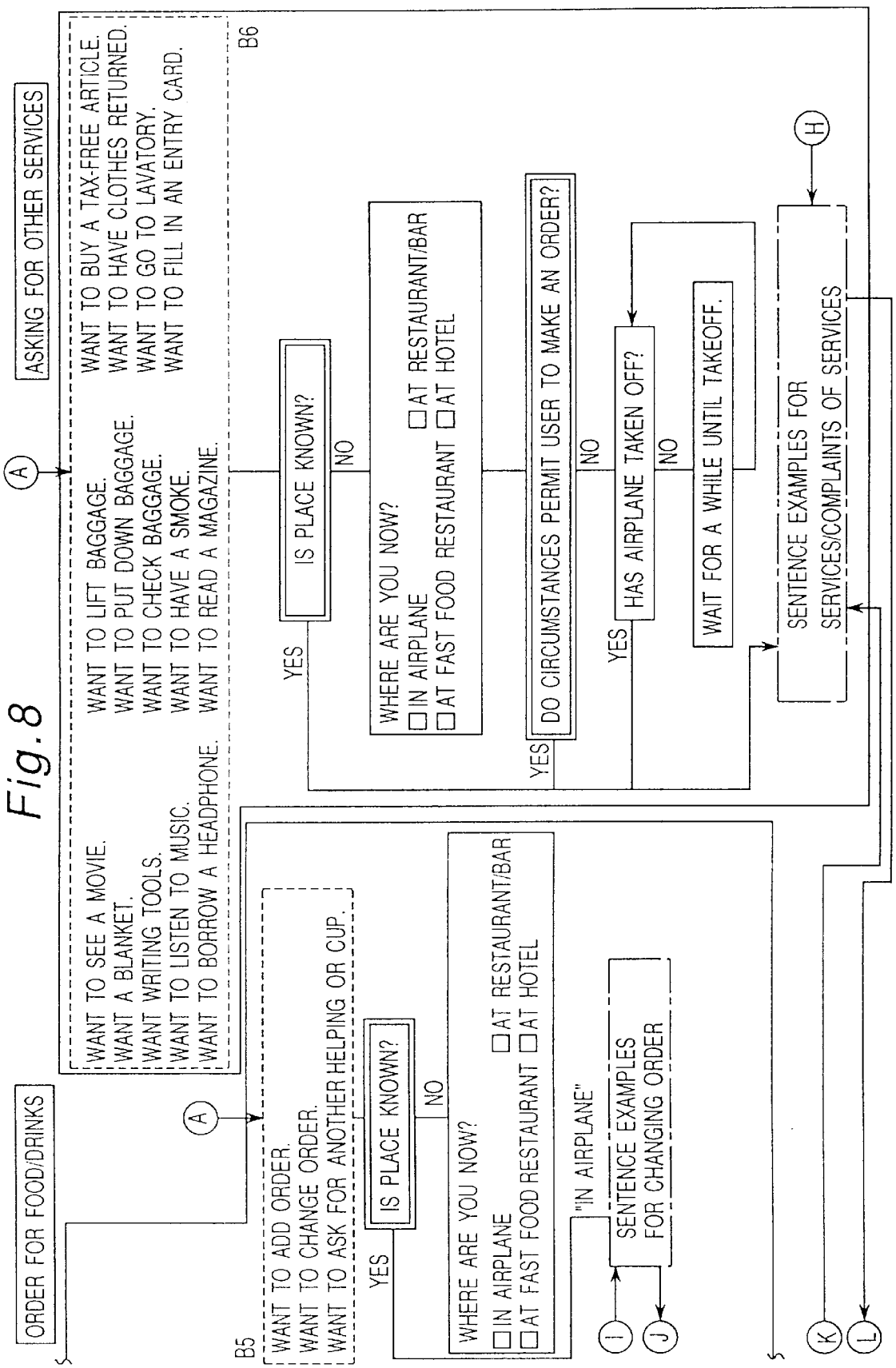
Figure 9:
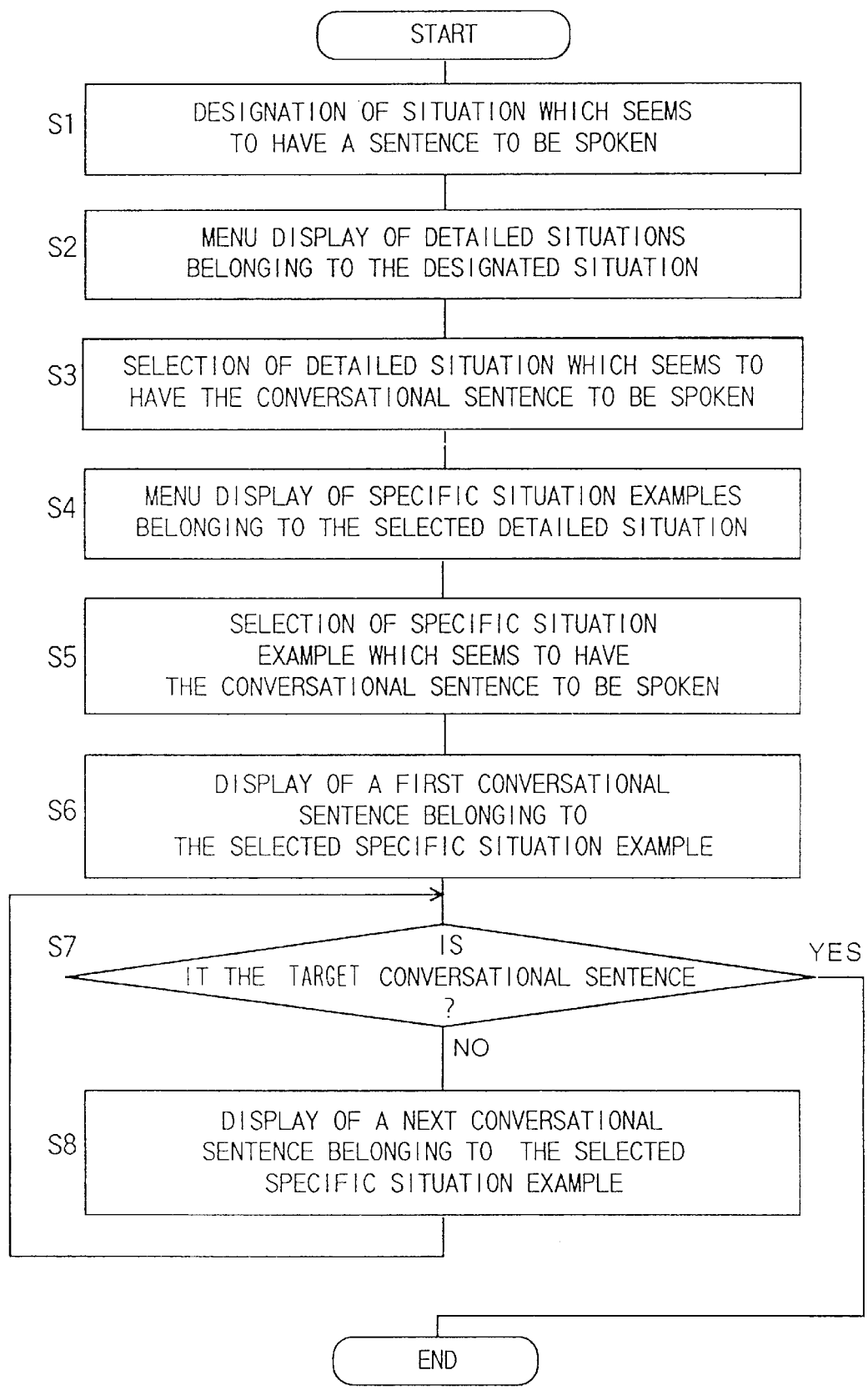
FIG. 9 is a flow chart of a menu search operation in the prior art translation apparatus.

Referring to FIGS. 4 and 5, when an item of "designate by input" is selected from the menu of "What assistance do you want?" displayed as shown by the display example D1 and a desire sentence "want to complain" as shown by a desire sentence example B3 is entered directly, it is impossible to start the processing for a present situation because the kind of the complaint is unclear. Therefore, the desire is specified through queries to the user, as follows.

When the place where the desire sentence "Want to complain" was entered is unclear, a selection menu with a query "Where are you now?" is displayed as shown in a display example D10. Then, if an item "In airplane" is selected, with a confirmation that the airplane has taken off, a further selection menu with a query "What is the complaint about?" is displayed as shown in a display example D11. Then, if an item "Seat" is selected, the situation is specifically determined, so that the program enters the processing for the situation of "Seating". Meanwhile if an item "Food/drinks" is selected, the program enters the processing for the situation of "Order for food/drinks". If an item of "Other services" is selected, the program enters the processing for the situation of "Asking for other services".

. . . steps S11 to S17, steps S14 to S17, and S14

If the processing for a situation has ever been done as in the case of the situation "Seating" as described above, a condition concerning the desire, "In airplane", has been stored in the RAM 5. Therefore, the display example D10, "Where are you now?", is not displayed, but the display example D11, "What is the complaint about?", is displayed.

. . . steps S11 to S17, S14

The above embodiment has been described a case where, with the display example D1 "What assistance do you want?" displayed, a desire sentence concerning "Seat" is entered and then the situation "Seating" is specifically determined. However, when a desire sentence concerning a matter other than "Seat" is entered, the program naturally moves to the processing for a situation according to the content of the desire sentence.

For example, when a desire sentence "Thirsty" as shown in a desire sentence example B4, or a desire sentence "Want to ask for another helping or cup" as shown in a desire sentence example B5 is entered, the situation is specifically determined to be "Order for food/drinks", so that the program enters the processing for the situation of "Order for food/drinks". When a desire sentence "Want to lift a baggage" as shown in a desire sentence example B6 is entered, the situation is specifically determined to be "Asking for other services". Thus, the program enters the processing for the situation of "Asking for other services". Also, when a desire sentence "Want to know arrival time" is entered as shown in a desire sentence example B7, the situation is specifically determined to be "Inquiring". Therefore, the program starts the processing for the situation of "Inquiring".

In this process, even in the case where each of the above desire sentences is entered immediately after the translation operation has started with the power turned on, if, prior to the previous turning off of the power, the item of "In airplane" was selected in response to the query "What assistance do you want?" in the display example D1, and the item "Desires about seat" was selected from the display example D2 of "Assistance available in airplane", and the processing for the situation of "Seating" was carried out, then the RAM 5 already stores the desire-related conditions such as "In airplane", "Seat has been determined", "The airplane has taken off", and the like. Therefore, the desire analyzer 6 is enabled to determine the place and circumstances based on the desire-related conditions stored in the RAM 5, without requiring additional user's input and to promptly reach the stage at which the situation and desire have been specified to some degree.

In this way, by avoiding iterations of asking the user the same questions in searching for conversational sentences related to the previously selected conversational sentence, it is possible to realize a system that impresses the user that it has intelligence.

As described above, according to the present embodiment, the user presents a desire that serves as a clue for the apparatus to specifically determine the desire that the user potentially has, by selecting an appropriate item corresponding to what the user wants to communicate to the counterpart, from the desire sentence menu displayed on the display section 9 under the control of the desire analyzer 6, or by directly entering a desire sentence in the form of "want to do" with the tablet 1.

Then, the desire analyzer 6 analyzes the clue-making desire presented by the user. If the desire analyzer 6 cannot specifically determine the situation of desire, it presents a query for narrowing the desire content. This operation is repeated until the situation of the desire is determined. Then, in the determined situation, if the desire content cannot be specifically determined, the desire analyzer 6 presents a query for further narrowing the desire content. This operation is repeated until the desire content is determined. Upon the determination of the desire content, the desire analyzer 6 sends the determined desire content to the optimum conversational sentence selector 7. The optimum conversational sentence selector 7 then selects a conversational sentence or sentences in the second language expressing the determined desire content, from the conversational sentence storage 4 of the ROM 3, and displays them on the display section 9.

Therefore, according to the present embodiment, the user first selects a-clue-making desire from a menu, or directly enters a desire sentence in the form of "want to do", and then responds to queries displayed on the display section 9 under the control of the desire analyzer 6. Only with such simple operations by the user, the content of the desire that the user potentially has is clarified with respect to the entered desire sentence, and a target conversational sentence is obtained. That is, it is unnecessary for the user to memorize which of the preset situations or present detailed situations a target conversational sentence corresponds to.

Further, as described above, when the desire content of the user is specifically determined and a conversational sentence is displayed, the desire analyzer 6 asks the user whether or not there is a related desire concerning the determined desire content, and if there is, the desire analyzer 6 executes only a processing for specifying the content of the related desire as described above to specifically determine the related desire.

Therefore, when a conversational sentence to be used in a situation related to the first conversational sentence is desired, the processing for the situation determination is omitted so that the user is not required to repeat the operation for the determination of the same situation.

Further, the desire analyzer 6 extracts conditions (conditions related to the desire) for determining the situation and desire content from the responses of the user to the various queries made for narrowing the clue-making desire designated by the user at the beginning, and the desire analyzer 6 keeps the extraction results stored in the RAM 5. Then, at the time of determining the situation and determining the desire content, the desire analyzer 6 makes reference to the desire-related conditions stored in the RAM 5.

Therefore, the desire analyzer 6 needs only to inquire unclear conditions concerning the desire that are not stored in the RAM 5 or that have not yet been designated from the tablet 1, in the process of determining the situation or determining the desire content. Thus, there can be provided an intelligent translation apparatus.

It is noted that the algorithm for the translation operation in the present invention is not limited to that shown in the flow charts of FIGS. 2 and 3.

Further, in the above embodiment, the apparatus requires the user to input his or her desire in the form of "want to". However, instead of or further to this phrase, other equivalent phrases such as "wish to", "would like to", "be eager to", etc. can be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A translation apparatus, comprising:

an input section through which a desire phrase is input in a first language by a user;

a conversational expression memory for storing second language conversational expressions associated with particular desires;

a desire analyzer for analyzing the desire phrase input through said input section to clarify a user desire based on the desire phrase, said desire analyzer determining whether the input desire phrase from said input section can be automatically associated with a conversational situation and, if not, prompting the user for additional information;

a conversational expression selector for receiving an analysis result from said desire analyzer, selecting a conversational expression which expresses the clarified user desire from the second language conversational expressions stored in said conversational expression memory; and a display section for displaying the conversational expression selected by said conversational expression selector.

2. The translation apparatus according to claim 1, wherein said desire analyzer includes;

situation deciding means for deciding whether a specific conversational situation can be determined from the input desire phrase, and when such a specific situation can be determined deciding whether the determined situation is a previously registered situation, desire content deciding means for deciding whether a user desire corresponding to the desire phrase can be specifically determined within the specifically determined situation, and, if so, outputting the user desire as the analysis result, and querying means for querying the user about conditions which are necessary to determine the specific situation and/or the user desire with respect to a desire phrase when said situation deciding means has decided that a specific situation cannot be determined and/or said desire content deciding means has decided that the user desire cannot be determined, wherein said situation deciding means and said desire content deciding means respectively decide whether the situation and the user desire can be specifically determined by referring to a user's response to a query from said querying means.

3. The translation apparatus according to claim 2, wherein said desire analyzer further comprises:

condition extraction means for extracting a condition for specifically determining the situation or the user's desire based on the user's response to the query, wherein the translation apparatus further comprises:

a condition memory for storing the conditions extracted by said condition extraction means, and wherein said situation deciding means and said desire content deciding means respectively decide whether the situation and the user's desire can be specifically determined by referring to the conditions stored in said condition memory.

4. A method for translating from a first language to a target language comprising:

pre-storing a plurality of conversational expressions in the target language;

inputting a desire phrase in the first language;

analyzing the input desire phrase to clarify the specific expression the user intends to communicate, said analyzing step determining whether the input desire phrase can be automatically associated with a conversational situation and, if not, prompting the user for additional information;

selecting a conversational expression from said plurality of pre-stored conversation expressions in the target language which corresponds to the clarified specific expression indicated by said analyzing step.

5. The method according to claim 4, wherein said analyzing step includes;

attempting to determine a conversational situation based on the input desire phrase, and, if a conversational situation is determined, deciding whether the conversational situation is a previously registered situation, attempting to determine a specific user desire within the specific conversational situation, and, if a specific user desire is determined, outputting the specific user desire as the analysis result, when either said attempt to determine a conversational situation or said attempt to determine a specific user desire is unsuccessful, prompting the user to specify conditions needed to determine the conversational situation and/or the specific user desire, and receiving a user's response to said prompting step, wherein said user's response is used for subsequent attempts to determine the conversational situation and/or the specific user desire.

6. The method according to claim 5, wherein said desire analyzing step further includes, extracting a condition for determining the conversational situation or the specific user desire from the content of the user's response to said prompting step, wherein the translation method further comprises:

storing the conditions extracted by said condition extracting step, and wherein said conversational situation deciding step and said specific user desire determining step respectively decide whether the situation and the specific user desire can be determined in accordance with the stored conditions.

* * * * *